(12) United States Patent
Opheim

(10) Patent No.: US 7,865,907 B2
(45) Date of Patent: Jan. 4, 2011

(54) METHOD AND APPARATUS FOR PROVIDING AUTOMATIC SOFTWARE UPDATES

(75) Inventor: Greg Opheim, St. Paul, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1551 days.

(21) Appl. No.: 10/670,642

(22) Filed: Sep. 25, 2003

(65) Prior Publication Data
US 2005/0071851 A1  Mar. 31, 2005

(51) Int. Cl.
*G06F 3/00*   (2006.01)
*G06F 9/44*   (2006.01)
*G06F 9/46*   (2006.01)
*G06F 13/00*  (2006.01)

(52) U.S. Cl. ............................ 719/321; 719/327; 700/9
(58) Field of Classification Search ................. 719/321, 719/327
See application file for complete search history.

(56) References Cited

U.S. PATENT DOCUMENTS

| | | | |
|---|---|---|---|
| 5,796,602 A * | 8/1998 | Wellan et al. ................... 700/1 |
| 5,903,455 A * | 5/1999 | Sharpe et al. ................. 700/83 |
| 5,923,557 A * | 7/1999 | Eidson ........................ 700/129 |
| 5,960,214 A * | 9/1999 | Sharpe et al. ................. 710/15 |
| 5,980,078 A * | 11/1999 | Krivoshein et al. ............. 700/1 |
| 6,023,585 A * | 2/2000 | Perlman et al. ............. 717/178 |
| 6,446,202 B1 * | 9/2002 | Krivoshein et al. ............. 713/1 |
| 6,449,715 B1 * | 9/2002 | Krivoshein ..................... 713/1 |
| 6,668,376 B1 * | 12/2003 | Wang et al. ................. 717/178 |
| 6,694,354 B1 * | 2/2004 | Elg ............................ 709/217 |
| 6,728,787 B1 * | 4/2004 | Leigh .......................... 719/327 |
| 6,965,855 B1 | 11/2005 | Burbridge et al. |
| 7,065,769 B1 * | 6/2006 | Tolopka ....................... 719/321 |
| 7,266,812 B2 * | 9/2007 | Pagnano ...................... 717/136 |
| 2002/0035621 A1 * | 3/2002 | Zintel et al. .................. 709/220 |
| 2002/0083228 A1 * | 6/2002 | Chiloyan et al. ............... 710/9 |
| 2003/0061267 A1 * | 3/2003 | Dunstan ...................... 709/201 |

(Continued)

FOREIGN PATENT DOCUMENTS

EP  1 525 518  4/2005

(Continued)

OTHER PUBLICATIONS

Neumann et al., "Field Device Integration", Oct. 2001, IEEE, Emerging Technologies and Factory Automation, vol. 2, pp. 63-68.*

(Continued)

*Primary Examiner*—Hyung S Sough
*Assistant Examiner*—KimbleAnn Verdi
(74) *Attorney, Agent, or Firm*—Marshall, Gerstein & Borun LLP

(57) ABSTRACT

A software updating system enables a user to automatically identify and obtain a device description for use with an application and to update the application with the device description. The system communicates with a device to obtain device description identification information identifying the device description that is required to communicate with the device. Once the device description identification is obtained, the system downloads the device description from a device description database connected to, for example, the Internet. Subsequently, the system updates the application with the device description so that the application may communicate with the device.

18 Claims, 3 Drawing Sheets

U.S. PATENT DOCUMENTS

2005/0028172 A1* 2/2005 Yoshikawa et al. .......... 719/321
2006/0120316 A1 6/2006 Von Stein et al.

FOREIGN PATENT DOCUMENTS

WO  WO-02/077732 A1  10/2002
WO  WO-2004/013712 A1  2/2004

OTHER PUBLICATIONS

Examination Report under Section 18(3) issued in GB 0604082.8 by the United Kingdom Patent Office on Aug. 10, 2006.
International Preliminary Report on Patentability for PCT/US2004/026612 dated Mar. 27, 2006.
International Search Report issued in PCT/2004/026612 mailed on Feb. 21, 2005.
Written Opinion issued in PCT/US2004/026612 application mailed Feb. 21, 2005.
Augustin et al., "Electronic Device Description Language-Basis fur eine einheitliche und platt-formunabhangige Geratebedienung," *Automatisierungstechnische Praxis* ., pp. 24-28, 30-32 (1999).
Bowden R., "What is HART?" XP002219605 (1997).
Examination Report for Application No. GB0604082.8, dated Mar. 1, 2007.

\* cited by examiner

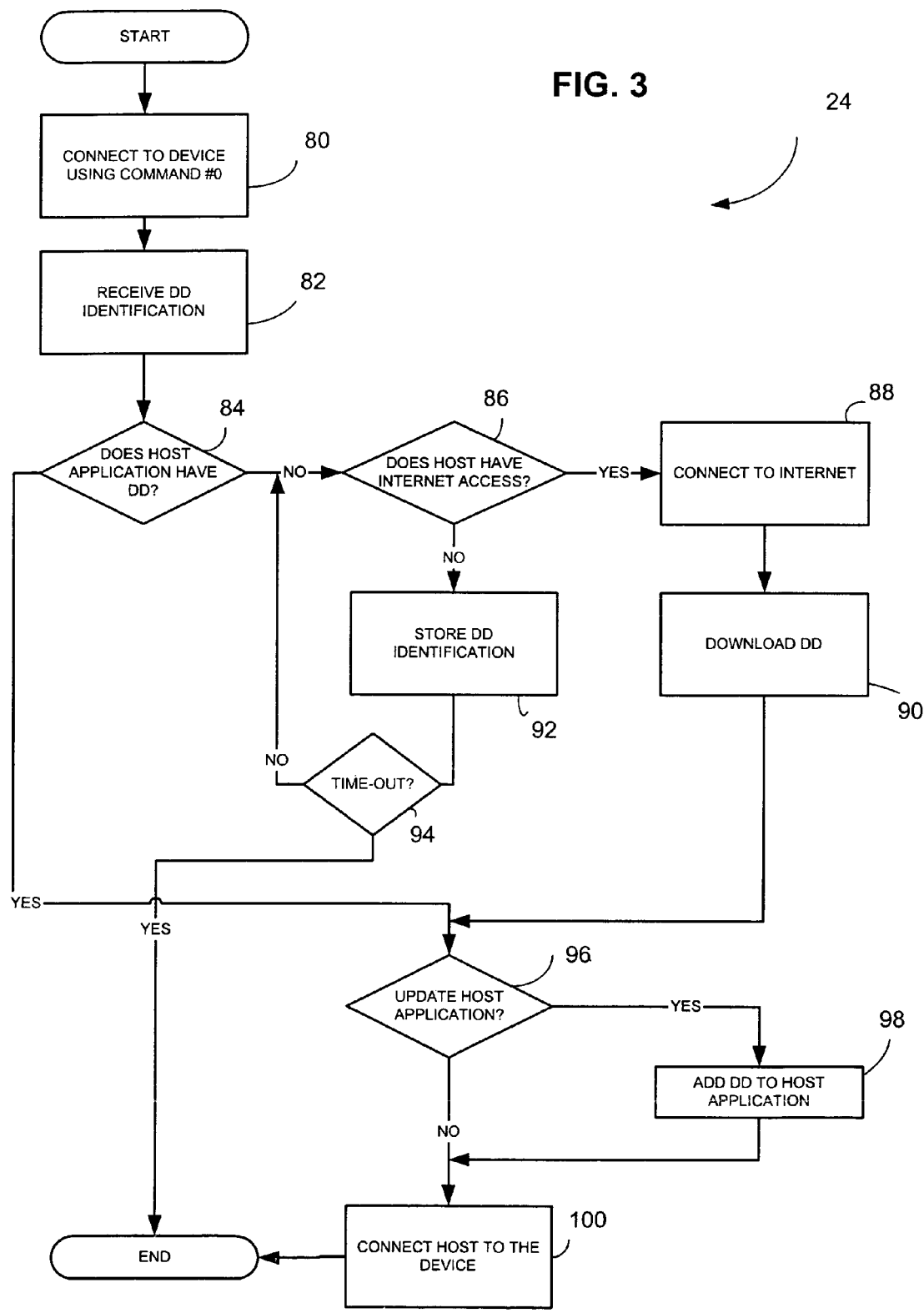

METHOD AND APPARATUS FOR PROVIDING AUTOMATIC SOFTWARE UPDATES

TECHNICAL FIELD

This patent relates generally to computer software, and more particularly, to computer software used in process plants.

BACKGROUND

Process plants, like those used in chemical, petroleum or other processes, typically include one or more process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. While a typical process plant has many process control and instrumentation devices, such as valves, transmitters, sensors, etc. connected to one or more process controllers which execute software to control these devices during the operation of the process, there are many other supporting devices which are also necessary for or related to process plant operation.

For example, many process plants have other computers which execute various host applications related to business functions, maintenance functions, configuration functions, diagnostic functions, etc. In particular, many process plants, and especially those which use smart field devices, use asset management applications to help monitor, track, and maintain the devices within the plant regardless of whether these devices are process control and instrumentation devices or are other types of devices. The Asset Management Systems (AMS) application sold by Emerson Process Management enables communication with and stores data pertaining to field devices to ascertain and track the operating status of various field devices.

Maintenance personnel who are responsible for ensuring that the actual equipment within the process is operating efficiently, and for repairing and replacing malfunctioning equipment, use host applications such as maintenance interfaces, the AMS application discussed above, and many other diagnostic applications to access information about the operating states of the devices within the process.

Generally, the various devices used in any particular process plant can be expected to be manufactured by a number of different manufacturers. Moreover, it is quite likely that not all of the devices communicate with each other or with the process control system in the same manner. To overcome the problem of incompatibility among devices provided by different manufacturers, the process instrumentation industry uses several standardized digital device communication protocols as defined or promulgated by various organizations, such as HART Communication Foundation, FOUNDATION™ Fieldbus, etc.

Typically, the communication protocols defined by these foundations include standards that specify how each device identifies itself and communicates with a process control system through the use of what is known as a device description (DD). Each device type typically has its own DD, which is a formal description of the data and operating procedures for a field device, including variables, methods, commands, menus and display formats associated with various features of the device. Information about every accessible variable of the device is generally included in the device description to thereby define the compatibility of and possible communications with the device. Such variables include, for example, process measurements, any derived values, and all the internal parameters of the device such as range, sensor type, choice of linearization, materials of construction, manufacturer, revision number, etc.

The DDs for various devices are typically used in a number of different manners. For example, when a process application or host application is implemented in a process plant, the maintenance personnel responsible for maintaining the process application may need to get help information about various parameters of various devices. Similarly, system designers writing a process application may use a DD to gain further information about a device. Device manufacturers generally provide DDs on a computer readable media so that these DDs can be easily copied into various process control system computers or into various process plant related applications. However, if a process application (such as a control, maintenance, diagnostic, configuration or other application) was developed before a particular device came into existence, the process application may not have access to the DD or other information about that device, which means that the process application will be unable to communicate with the device when the device is added to the process plant on which the application is used.

SUMMARY

A software updating system enables a user to identify and obtain a DD for use with an application and to update the application with the DD. The software updating system communicates with a device, such as a field device, to obtain DD identification information identifying the DD needed to communicate with the device. Once the DD identification is obtained, the updating system then downloads the DD from a device description database connected to, for example, the Internet. Thereafter, the application can communicate directly with the device using the proper DD.

The software updating system described herein may be used in a process plant when a process application, installed on a host computer, a controller or other computer, needs to communicate with a process control device but has not been programmed to do so. As discussed above, many process control devices used in process plants communicate with each other and with other applications using a standard or open communication protocol, such as the HART communication protocol which uses a well known device description language (DDL). If a process application, which must communicate with a device, does not have access to a DD for the device, this process application will not be able to effectively communicate with that device. The software updating system described herein may first search for the necessary DD on a local DD database in the process plant and, if the software updating system cannot find the DD on the local DD database, the software updating system downloads the proper DD from an online DD database, such as a HART Communication Foundation DD database, connected, for example, to the Internet.

BRIEF DESCRIPTION OF THE DRAWINGS

The present patent is illustrated by way of examples and not limitations in the accompanying figures, in which like references indicate similar elements, and in which:

FIG. 3 is an exemplary flowchart of an automated software updating program.

DETAILED DESCRIPTION OF THE EXAMPLES

Figure 1:
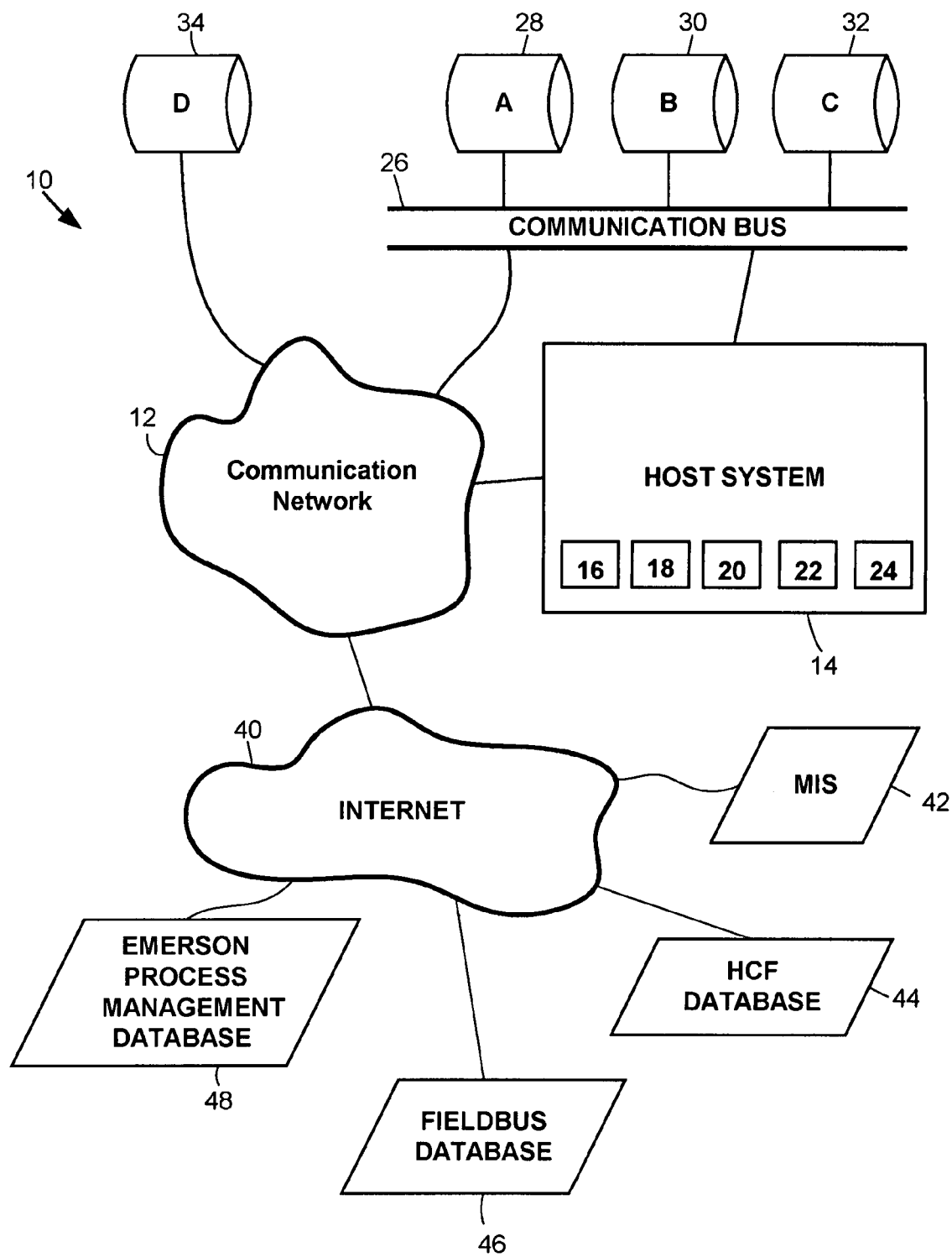
FIG. 1 is an exemplary block diagram of a process plant.

Referring now to the accompanying drawings, FIG. 1 illustrates a process plant 10 having a host computer 14 connected via a communication bus 26 to a number of devices 28, 30, 32, which may be field devices or other types of devices. The communication bus 26 can be an analog bus, a digital bus or a combined analog and digital bus. The devices 28-32 may be process control devices such as valves, switches, transmitters, controllers, or any other types of devices. The process plant 10 may also contain a number of other devices such as a device 34 that may be connected to the host system 14 indirectly through an additional communication network 12.

The host system 14 may have a number of process applications, such as a process control system application 16, a plant simulation application 18, a plant maintenance application 20, a diagnostic application, a configuration application, etc. The host system 14 may also have a local DD database 22, as well as a software updating application 24 that automatically updates these applications 16-20 or other host applications on the host system 14, or applications in other computers connected to the host system 14.

Of course, the communication network 12 may be implemented using any desired communication protocol including, for example, the Ethernet protocol, the Internet communication protocol, any known or desired wireless communication protocol (WCP), any known or desired local area network (LAN), etc. The communication network 12 may also be connected to other communications systems outside of the process plant 10, such as a wide area network (WAN), the Internet, etc., in any desired manner. In the exemplary illustration of FIG. 1, the communication network 12 is connected to the Internet 40 so that the host system 14 is indirectly connected to the Internet 40 via the communication network 12. However, in an alternate example, the host system 14 may be directly connected to the Internet 40.

In FIG. 1, the Internet 40 is connected to a number of databases or systems that may actively communicate with various parts of the process plant 10. For example, the Internet 40 is connected to a management information system (MIS) 42 that collects various information regarding input, production, etc., of the process plant 10. The Internet 40 is also connected to a HART communication foundation (HCF) database 44, a FOUNDATION Fieldbus database 46, and may be connected to databases provided by various device manufacturers, such as an Emerson Process Management device database 48, etc. The databases 44, 46 and 48 contain information about various devices used in the process plant 10. For example, the FOUNDATION Fieldbus database 46 may contain DDs for various Fieldbus devices used in the process plant 10, while the HCF database 44 may store DDs for various HART devices. If desired, the DDs may also or alternatively be stored in various separate databases, such as databases provided by different device manufacturers. For example, the Emerson Process Management device database 48 is an example of a database that may be provided by a device manufacturer to store DDs for various devices manufactured by Emerson Process Management.

Various parts of the process plant 10 may access the HCF database 44, the FOUNDATION Fieldbus database 46, a Profibus database (not shown), etc., to obtain DDs for devices within the process plant 10, such as the devices 28, 30, 32, 34, etc. For example, the host system 14 may send a request to the HCF database 44 for a DD associated with the device 28 using the communication network 12 and the Internet 40. Even though, in FIG. 1, the host system 14 is shown to be located on a single computer, in practice, the host system 14 may be set up as a distributed system or as a client-server system using a number of computers.

Figure 2:
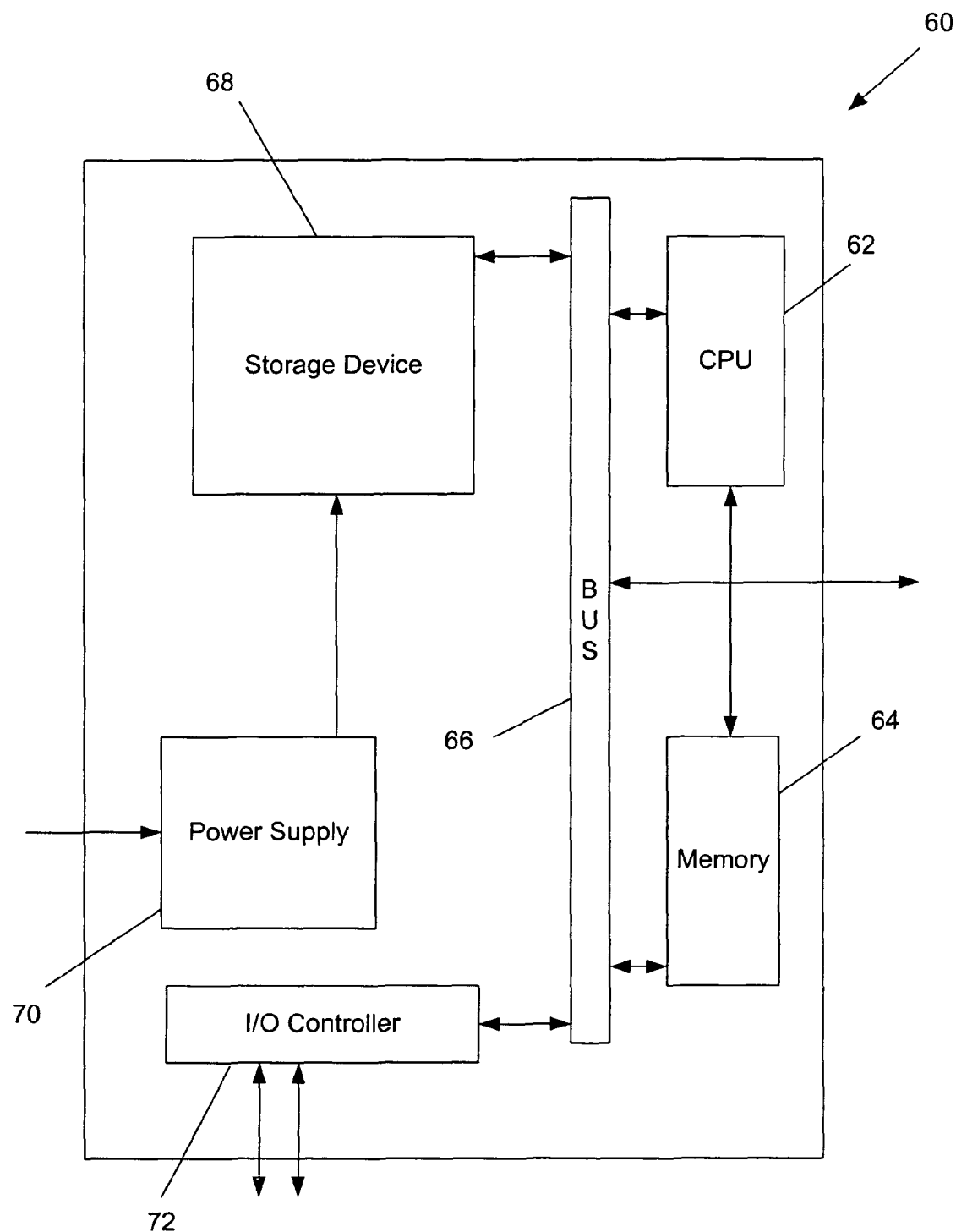
FIG. 2 is an exemplary block diagram of a computer used in the process plant of FIG. 1.

FIG. 2 illustrates a block diagram of an example computer 60 that may be used in the process plant 10 as the host system 14. As used herein, the term "computer" refers to any type of computing device (e.g., a portable computer, a laptop computer, a PDA, a desktop computer, a server, etc.) that can be used as a node on a computer network. The computer 60 of FIG. 2 includes many conventional hardware components commonly used in computers. In particular, the computer 60 includes a central processing unit (CPU) 62, a memory 64, an internal communications bus 66, a storage device 68, a power supply 70 and an input/output (I/O) controller 72. Even though the computer 60 illustrated in FIG. 2 shows these components internal to the computer 60, a person of ordinary skill in the art will appreciate that some of these components can be external to the computer 60.

The computer 60, when used as the host system 14, may be connected to the communication network 12 and to the communication bus 26 via the internal communication bus 66. The storage device 68 and/or the memory 24 may be used to store various applications running on the host system 14 as well as to store data used by such applications. For example, the process control system application 16, the plant simulation application 18, the plant maintenance application 20 and the local DD database 22, may be stored on the storage device 68.

A user of the host system 14 may load a DD for a specific device into the local DD database 22 from any desired source, such as a CD provided by the manufacturer of the device. Alternately, a user may download and store a device DD from an online DD database connected to the Internet 40. It is also possible that the process plant devices 28, 30, 32, 34, etc., used in the process plant 10 may be manufactured by a number of different device manufacturers, in which case the DDs for these devices will be provided by different sources. For example, the manufacturer of the device 28 may provide the DD necessary to communicate with the device 28 on a CD, which allows a process plant operator to store the DD for the device 28 in the local DD database 22. A host application may have its own DD database that can store the DD for the device 28. For example, if the process control system application 16 already has a DD for the device 28, the process control system application 16 will be able to communicate with the device 28 using the DD stored in the local DD database 22 or the DD provided with the process control system application 16.

However, it is quite possible that the manufacturer of a particular device, such as the device 30 of FIG. 1, did not provide a DD for that device, or that a user did not install the DD for the device 30 on the local DD database 22. Alternatively, a host application installed on the host system 14, such as the plant simulation application 18, may not have a DD for a device (e.g., the device 30 of FIG. 1) because the device 30 was installed in the process plant 10 after the plant simulation application 18 was installed. In this situation, the plant simulation application 18 will not be able to communicate with the device 30. The software updating application 24, which is described in further detail with respect to FIGS. 3-4 below, is designed to allow host applications, such as the applications 16-20, to communicate with the process devices 28-34 when the DDs for the devices 28-34 have not previously been provided to the applications 16-20, or to the host system 14.

FIG. 3 illustrates one possible flowchart that may generally describe the operation of the software updating application 24 of FIG. 1. Generally speaking, the software updating application 24 allows various host applications on the host system 14 to communicate with various devices in the process plant 10. If desired, the software updating application 24 can be set up to operate automatically at a particular periodic frequency, and if set up in this manner, the software updating application 24 may look for a log of communication requests by various host applications on the host computer 14. Such a log of requests may identify the devices with which communication is desired and can be stored in the memory 64, in registers of the CPU 62 of the host system 14, or in any other desired location.

Alternatively, the software updating application 24 can be initiated by a user or by a host application running on the host system 14 or even in another host computer. For example, a requesting application, e.g., the plant simulation application 18, may send a command to the CPU 62 to initiate the software updating application 24 when the application 18 needs to communicate with a device for which the application 18 does not have a DD. In this case, the command to the software updating application 24 may contain some information about the plant simulation application 18 and about the device with which communication is required by the plant simulation application 18.

For simplicity, FIG. 3 illustrates the operation of the software updating application 24 in response to a request received by a requesting application to communicate with the device 28. Upon receiving such a request, a block 80 connects to the device 28 and, using a known command, requests a DD identification for the device 28. Such a DD identification request may be specified in the protocol used to communicate with the device 28. For example, if the HART protocol is used, a command #0 may be sent to the device to request the DD identification for that device. The request to the device 28 can be sent from the host system 14 over the communication bus 26, over the communication network 12, or via any other communication link between the host system 14 and the device 28.

A block 82 receives the DD identification from the device 28 in response to the request sent by the block 80 and stores the received DD identification for the device 28 in the memory 64. As is known, the DD identification provided by the device 28 may contain information such as a manufacturer ID, a device identifier, a device revision, etc., for the device 28. A block 84 determines if the host system 14 has the DD for device 28 using the device information within the received DD identification. For example, the block 84 may search the local DD database 22 or one of the other host applications on the host system 14 for the DD identified by the DD identification for the device 28.

If the block 84 determines that the host system 14 does not have the DD for the device 28, a block 86 determines if the host system 14 has access to the Internet 40. If so, a block 88 identifies a DD database connected to the Internet that has the DD for the device 28. The block 88 may make such a determination by sending a request over the Internet 40 and by analyzing responses to such a request. Of course, the block 88 may also store the Internet addresses of likely or known DD databases, such as the HART database 44, the FOUNDATION Fieldbus database 46, or one or more manufacturer's databases, etc, and may connect to these databases to search for the desired DD. The block 88 may also use any desired search engine, browser, etc., to search for the desired DD. If desired, the block 88 may interact with the operator using an interactive screen to enable the operator to assist in finding the appropriate DD on the Internet. The software updating application 24 may also provide a list relating names of various device manufacturers to the Internet addresses of the DD Databases provided by these manufacturers.

When the block 88 finds a database, such as the HART database 44, that contains the DD for the device 28, a block 90 sends a request to the HART database 44 to obtain the DD for the device 28. Such a request to the HART database 44 may contain some or all of the information contained in the DD identification for the device 28 as obtained by the block 82.

If the block 86 determines that the host system 14 does not have access to the Internet 40, a block 92 stores the DD identification and periodically checks the availability of the connection to the Internet 40. Alternatively, the host system 14 may also receive the necessary DD on a CD-ROM, diskette, etc., from a DD provider. A block 94 may track the time elapsed during which the block 92 has been checking for a connection to the Internet 40 and time-out after a predetermined amount of time to terminate the software updating application 24.

In any event, after the block 90 downloads the DD for the device 28, or when the block 84 determines that the host system 14 has the DD for the device 28, a block 96 determines whether the requesting application (e.g., the plant simulation application 18) needs to be updated. A user may specify that host applications should be automatically updated for DDs as necessary. Alternatively, the software updating application 24 can be programmed so that a command can be sent to the block 96 to update a host application with a desired DD.

If the requesting application is to be updated with the DD for the device 28, a block 98 performs such an update. An updating of a requesting application with the DD for the device 28 may involve inserting the DD for the device 28 at various desired locations into the requesting application. Alternatively, the updating of an application with the DD for the device 28 may involve saving the DD for the device 28 into the memory 64 at a specific location and inserting, as necessary, a call to that specific location into the requesting application. Insertion of code into a software application is well known to those of ordinary skill in the art and therefore will not be discussed in detail here. As a result of the updating performed by the block 98, the requesting application is able to communicate with the device 28 without having to locate the DD for the device 28, resulting in faster performance. Such updating also allows the requesting application to communicate with various devices installed in the process plant 10 after the requesting application was configured or installed on the host system 14.

Whether the requesting application is updated with the DD for the device 28 or not, a block 100 may connect the requesting application to the device 28 using the DD for the device 28. It will be understood that the updating block 96 may communicate with a host application located remotely with respect to the updating application 24 via any desired communicant network to update that remote application with the DD.

Once the requesting application, such as plant simulation application 18, is updated, it can automatically connect to the device 28 without any assistance from the software updating application 24. However if it was decided, for whatever reason, that the requesting application is not to be updated with the DD for the device 28, the block 100 allows the requesting application to make such a connection to the device 28 using the DD saved on the local DD database 22.

While the host system 14 is illustrated and described herein as communicatively connected to the DD databases via the Internet using an Internet protocol, the host system 14 may be connected to and communicate with the DD databases using any other wide area communication system or WAN and such WANs are viewed to be interchangeable with the Internet. Furthermore, such WANs or the Internet may be or include as a part thereof a wireless network using any desired wireless communication protocol.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of updating a host application running on a host system in a process plant, wherein the host system is connected to a plurality of process control devices used in the process plant, the method comprising:

receiving a first command at the host system from the host application requesting to communicate with a particular one of the plurality of process control devices;

sending a second command from the host system to the particular one of the plurality of process control devices to request a device description identification identifying a device description for the particular one of the plurality of process control devices, wherein the device description identification includes a device identifier, a manufacturer ID, or a device revision for identifying the device description for the particular one of the plurality of process control devices, and wherein the device description comprises data and operating procedures for the particular one of the plurality of process control devices, including variables, methods, commands, menus or display formats associated with one or more features of the particular one of the plurality of process control devices;

receiving the device description identification at the host system from the particular one of the plurality of process control devices;

searching on the host system for the device description identified by the received device description identification;

downloading the device description identified by the received device description identification into the host system if the host system does not have the device description identified by the received device description identification, wherein downloading the device description includes:

connecting the host system to a communication network;

requesting the device description identified by the received device description identification from a device description database connected to the communication network; and receiving the device description from the device description database; and updating the host application to include the data and operating procedures for the particular one of the plurality of process control devices, described in the device description identified by the received device description identification.

2. The method of claim 1, wherein downloading the device description includes downloading the device description from one of a CD-ROM, a diskette, and an online database.

3. The method of claim 1, wherein updating the host application includes copying the device description into the host application.

4. The method of claim 1, wherein the host system is a system in the process plant.

5. The method of claim 1, wherein the device description database is one of a Fieldbus database, a Profibus database and a HART communication foundation database.

6. The method of claim 1, wherein downloading the device description includes storing an Internet address of the device description database and using one of an Internet communication protocol and a wireless communication protocol to connect to the device description database.

7. A method of providing a software update for a host application running on a host system, the method comprising:

storing a device description identification identifying a device description on a process control device, the device description identification including a device identifier, a manufacturer ID, or a device revision, for identifying the device description, and the device description defining data and operating procedures for the process control device including variables, methods, commands, or menus of display formats associated with one or more features of the process control device;

receiving a first command at the host system from the host application requesting to communicate with the process control device;

sending a second command to the process control device to request the device description identification, wherein the device description is used to communicate with the process control device;

receiving the device description identification at the host system from the process control device;

determining if the host system includes the device description by searching on the host system for the device description identified by the received device description identification;

automatically downloading the device description identified by the received device description identification onto the host system if the host system does not have the device description, wherein automatically downloading the device description includes:

determining if the host system is connected to the Internet;

initiating an Internet session if the host system is connected to the Internet; and sending a request to a device description database connected to the Internet for downloading the device description identified by the received device description identification onto the host system; and updating the host application with the data and operating procedures for the process control device described in the device description identified by the received device description identification.

8. The method of claim 7, further including storing the device description identification on the host system.

9. The method of claim 7, further including storing the device description identification.

10. The method of claim 7, further including storing on the host system a list relating an identification of a device manufacturer to an Internet address of a device description database provided by the device manufacturer.

11. The method of claim 10, wherein the host application is one of (1) an asset management system application, (2) a plant simulation application, (3) a plant maintenance application, (4) a plant monitoring application, and (5) a process control application.

12. A computer system for updating a process control host application with a device description of a process control device, the device description comprising data and operating procedures for the process control device including variables, methods, commands, menus or display formats associated with one or more features of the process control device, the computer system being connected to a device description database via a communication network, the computer system comprising:
    a processing unit;
    a computer readable memory; and
    a software routine stored on the computer readable memory and executable on the processing unit to:
    receive a request to communicate with the process control device from the host application;
    request a device description identification identifying a device description for the process control device from the process control device;
    receive the device description identification related to the process control device from the process control device, the device description identification including a device identifier, a manufacturer ID, or a device revision, for identifying the device description;
    searching on the computer system for the device description identified by the received device description identification;
    download the device description identified by the received device description identification of the process control device from the device description database if the computer system does not have the device description; and
    update the host application with the data and operating procedures for the process control device described in the device description identified by the received device description identification.

13. The computer system of claim 12, wherein the software routine is further executable on the processing unit to download the device description using one of an Internet protocol and a wireless communication protocol.

14. The computer system of claim 12, wherein the software routine is further executable on the processing unit to identify a device description language source of the host application, interpret the device description into the device description language source and insert the device description into the host application.

15. The computer system of claim 12, wherein the host application is one of (1) an asset management system application, (2) a plant simulation application, (3) a plant maintenance application, (4) a plant monitoring application, and (5) a process control application.

16. The computer system of claim 12, wherein the software routine is further adapted to update a remote host application located on a remote computer communicatively connected to the computer system.

17. A computer system for use in a process plant having a plurality of process control devices and one or more process applications requiring communication with the plurality of process control devices, the computer system comprising:
    a non-transitory computer readable medium on which computer instructions are stored, when executed by a computer processor the computer instructions providing:
    a communication module receiving a request to communicate with one of the plurality of process control devices from one of the one or more process applications, and requesting a device description identification identifying a device description for the one of the plurality of process control devices from the one of the plurality of process control devices, wherein the device description comprises data and operating procedures for the one of the plurality of process control devices including variables, methods, commands, menus or display formats associated with one or more features of the one of the plurality of process control devices;
    a storage device receiving the device description identification from the one of the plurality of process control device devices and storing the device description identification, wherein the device description identification includes a device identifier, a manufacturer ID, or a device revision, for identifying the device description;
    a search module searching on the computer system for the device description identified by the received device description identification, and searching for a device description database storing the device description identified by the received device description identification;
    a downloading module downloading the device description identified by the received device description identification from the device description database if the computer system does not have the device description, wherein downloading the device description includes:
        connecting the computer system to a communication network;
        requesting the device description identified by the received device description identification from the device description database connected to the communication network; and
        receiving the device description from the device description database; and
    an updating module updating the one of the one or more process applications with the data and operating procedures for the one of the plurality of process control devices described in the device description identified by the received device description identification.

18. The computer system of claim 17, wherein the downloading module communicates with the device description database using the Internet protocol.

* * * * *